United States Patent [19]

Vorachek et al.

[11] 4,038,375

[45] July 26, 1977

[54] PROCESS FOR THE RECOVERY OF SELENIUM FROM SELENIUM-CONTAINING URETHANE SOLUTIONS

[75] Inventors: James H. Vorachek, Drexel Hill, Pa.; Thomas A. Washall, Wilmington, Del.

[73] Assignee: Atlantic Richfield Company, Los Angeles, Calif.

[21] Appl. No.: 723,359

[22] Filed: Sept. 15, 1976

[51] Int. Cl.$^2$ ............................................. C01B 19/00
[52] U.S. Cl. ................................... 423/510; 423/508; 423/509; 75/81; 75/169
[58] Field of Search ............... 423/510, 509, 508, 395; 75/81, 169

[56] References Cited

U.S. PATENT DOCUMENTS

| | | | |
|---|---|---|---|
| 1,915,703 | 6/1933 | Towne et al. | 423/510 |
| 2,406,666 | 8/1946 | Clark et al. | 423/509 |
| 2,616,791 | 11/1952 | Roseman et al. | 423/509 |
| 3,577,216 | 5/1971 | Weiss et al. | 423/509 |
| 3,677,696 | 7/1972 | Bryk et al. | 423/509 X |
| 3,895,054 | 7/1975 | Zajacek et al. | 260/471 C |

OTHER PUBLICATIONS

"Extractive Metallurgy", vol. 81, 1974, p. 257.

*Primary Examiner*—Edward Stern
*Attorney, Agent, or Firm*—Delbert E. McCaslin

[57] ABSTRACT

A process for the recovery of selenium from a urethane solution containing selenium compounds by contacting the selenium-containing urethane solution at a suitable temperature with an aqueous solution of a mercuric salt compound or mixtures thereof to form an insoluble precipitate of mercury-selenium compounds or complexes. The selenium and mercury may be recovered from the resulting precipitate in a form suitable for reuse in the preparation of urethanes and selenium removal respectively.

17 Claims, No Drawings

PROCESS FOR THE RECOVERY OF SELENIUM FROM SELENIUM-CONTAINING URETHANE SOLUTIONS

BACKGROUND OF THE INVENTION

In U.S. Pat. No. 3,895,054 there is disclosed a process for the manufacture of urethanes (carbamic acid esters) by reacting an organic compound containing at least one hydroxyl group, e.g. ethyl alcohol, with carbon monoxide and a nitrogenous organic compound at elevated temperature and pressure in the presence of a selenium catalyst and a base and/or water.

The present invention is directed to a simple and effective method of recovering the selenium from urethane solutions produced, for example, by the above described process and containing selenium which may be in the form of selenium per se, inorganic selenium compounds and organoselenium compounds. Because of the high reactivity of selenium, when used as a catalyst as in the above reaction its combination with organic compounds very frequently results in the formation of organoselenium compounds, such as benzoselenazol and diethyl diselenide, which remain in solution with the urethane reaction product. In such reaction, a portion of the selenium catalyst such as selenium per se or selenium dioxide, selenium disulfide, selenium oxychloride, etc. is converted to one or more organoselenium compounds which may be classified generally as selenols, selenides, benzoselenazoles, esters of selenocarbonic acid, selenic acid and selenious acid, selenones and the like. The type and number of organoselenium compounds which may be formed is a function of the reaction conditions used to produce the urethanes such as time, temperature, pressure and solvent. In addition, the inorganic selenium compounds used as catalysts or formed in the reaction may also remain in solution with the urethane product.

Because of the cost and toxicity of selenium, it is essential that as much of the selenium be recovered from the urethane reaction product as is possible and from the inorganic or organoselenium compounds in a form suitable for reuse as a catalyst.

Prior art processes have been proposed for the recovery of selenium from certain organic reaction products and aqueous or acidic solutions. However, such prior art processes are generally narrow in scope and application and have proven to be of little or no value to the recovery of selenium from urethane solutions containing same.

In an article by H. Hauptmann and W. F. Walter, Journal of American Chemical Society, Vol. 77, pp. 4929-4930, Sept. 20, 1955, the action of Raney nickel on organoselenium compounds to effect deselenization is described. A large excess of the Raney nickel is necessary accompanied by long reaction times resulting in partial deselenization.

U.S. Pat. No. 2,671,049 discloses a process for the removal of cyclic aliphatic sulfides from petroleum oils by contacting the oil with mercuric salts to precipitate a cyclic sulfides/mercury salt complex.

U.S. Pat. No. 3,577,216 relates to a process for the recovery of selenium IV used as a catalyst in the oxidative production of carboxylic acids by adding to the reaction products magnesium, zinc, aluminum, alkali and alkaline earth metal hydroxides, oxides, carbonates, bicarbonates and salts of the metals to precipitate metal selenite and reacting the metal selenite with a strong inorganic acid solution to obtain one of selenious acid and anhydride.

SUMMARY OF THE INVENTION

This invention relates to a process for the recovery of seleniuum from organic solutions containing selenium or compounds thereof. More specifically, the present invention concerns a process for the formation and removal of selenium in the form of mercury-selenium compounds or complexes from an effluent solution obtained from the selenium catalyzed conversion of an organic nitrocompound to produce a urethane as described for example in the aforementioned U.S. Pat. No. 3,895,054 and incorporated herein by reference. The urethane products produced by such process, which may contain one or more organoselenium compounds as well as metallic selenium and/or inorganic selenium compounds, is contacted with an aqueous solution of a water soluble-mercuric salt compound to form an insoluble mercury-selenium compound or complex without affecting the urethane product and minimizing any loss of urethane while substantially removing the selenium compounds. By such process of the invention substantial amounts of the selenium compounds are removed from the urethane solution as mercury-selenium compounds or complexes. The selenium so recovered may be separated from the mercury-selenium compound or complex, as hereinafter described, in a form suitable for reuse in the urethane synthesis reaction. The seleniuum free mercury may for example, be regenerated by contacting with a mineral acid, preferably nitric acid, to convert it to a form (mercuric nitrate) suitable for reuse.

An advantage provided by the process of the present invention, as compared to known selenium removal processes is the relative simplicity of adding an aqueous solution of a mercuric salt compound to a total urethane reaction product and thereby forming an insoluble mercury-selenium compound or complex with the contained selenium, which compound or complex may be readily removed from the solution by for example filtration and further treated to separate the selenium and mercury for further use.

It is an object of this invention therefore to provide a process for the substantial recovery of valuable selenium from selenium-containing urethane solutions and the ultimate purification of the urethane.

It is another object of this invention to provide a process for the recovery of selenium in a form suitable for recycle and reuse as a catalyst for the synthesis of urethanes from an organic compound containing at least one hydroxyl group with carbon monoxide and a nitrogenous organic compound.

It is a further object of this invention to recover contained selenium values from urethane solutions utilizing an aqueous mercuric salt solution to form a compound or complex with the selenium compounds and to recover the mercury and selenium from the compound or complex in a form suitable for recycle and reuse in the selenium recovery process and urethane synthesis respectively.

These and other objects and advantages of this invention will become apparent from the description of the invention which follows and from the claims.

DESCRIPTION OF THE INVENTION

In accordance with the present invention, a urethane solution containing selenium or compounds thereof, as for example, a urethane solution obtained by reacting an organic compound containing at least one hydroxyl group with carbon monoxide and an organic nitrogeneous compound containing at least one non-cyclic group, in which a nitrogen atom is directly attached to a single carbon atom and is also attached through a double bond to a oxygen or nitrogen atom, at elevated temperatures and pressures in the presence of a metallic selenium or selenium compound catalyst and a base and/or water, is subjected to a treatment with an aqueous solution of a mercuric salt compound, or mixtures thereof, to form compounds or complexes with the selenium compounds contained in the urethane at low temperatures, preferably ambient temperatures to precipitate and remove selenium compounds from the solution to provide an essentially deselenized urethane solution and to recover the valuable selenium.

The amount and type of selenium compounds in the crude urethane reaction product will generally depend on the type and amount of selenium compound, including selenium per se, employed to produce the urethane as well as the reaction conditions and urethane being produced. Thus, the amount of selenium in the form of selenium per se, inorganic selenium compounds or organoselenium compounds, may range from ½ to 5 percent but will generally be from 1 to 3 percent by weight of the urethane solution produced, for example, by the process as set forth in U.S. Pat. No. 3,895,054.

The selenium-containing urethane solutions may be contacted with the aqueous mercuric salt solutions by batch, semi-continuous or continuous process methods. For example, the aqueous solution of mercuric salt may be added to the crude urethane solution and, the insoluble mercury-selenium compounds or complex which is formed, separated by any suitable means, such as filtering or centrifuging. The selenium-containing crude urethane solution may be passed through an aqueous solution of a mercuric salt and through a filtering device, and the essentially selenium free effluent urethane recovered leaving the retained mercury-selenium compound or complex for further processing and separation of the selenium and mercury. Batch or semicontinuous methods are preferred to facilitate the separation of the insoluble mercury-selenium compound or complex from the essentially deselenized urethane.

The mercuric salts which may be employed either alone or in admixture to form the aqueous solution for use in the process of the invention are those mercuric salts which are soluble in water to an extent of at least 0.5 parts by weight of the salt per 100 parts by weight of water at ambient temperature, and essentially insoluble in the urethane being treated. Representative mercuric salts include for example, mercuric acetate, mercuric bromide, mercuric chloride, mercuric cyanide, mercuric nitrate, etc. with mercuric nitrate being preferred.

The parameters for the aqueous mercuric salt system suitable for selenium removal in this invention are (a) aqueous solutions that maintain a high level of selenium removal while the selenium loading is increasing as measured by the weight ratio of available mercury to reacted selenium, (b) mercuric salt solutions that are non-reactive with the urethane reaction product containing the selenium compounds to be recovered and, (c) mercuric salt solutions that are essentially insoluble in the urethane solution.

The aqueous mercuric salt solution is added to the crude urethane reaction product (which contains, in addition to the urethane product (carbamate), some related by products, alcohol, a base such as potassium acetate or an amine, various selenium compounds and selenium per se), and agitated to form a precipitate comprising mercury-selenium compounds or complexes. Generally the ratio of mercury to contained selenium employed in the process is 4:1. Higher or lower ratios of mercury to selenium may be used. Lower mercury/selenium ratios may be used to a minimum of 1:2.

Generally an equal volume of the aqueous mercuric salt solution based on the volume of crude urethane solution is added to the urethane solution to carry out the reaction and formation of the mercury-selenium compounds or complexes and precipitation and removal of the selenium compounds from the urethane solutions. Lesser amounts of salt solution may be employed so long as a sufficient amount is employed to react with the contained selenium compounds in the crude urethane solution. Larger amounts of salt solution may be employed, for example greater than 100 percent by volume based on the volume of urethane solution employed but is avoided since there is no apparent improvement in results, and accordingly, the addition of excess mercuric salts would only necessitate the burdensome recovery of a larger amount of mercury during final treatment to recover the selenium and mercury for reuse.

The concentration of the mercuric salt in the aqueous solutions employed is generally from 1 weight percent to 5 weight percent. Higher or lower concentrations may be employed so long as the mercury (Hg) concentration is greater than or at least equal to twice the selenium (Se) concentration.

The crude selenium-containing urethane solution may be contacted with the aqueous mercuric salt solution directly or if desirable, a solvent or mixture of solvents which are inert at the process conditions used, may be employed provided the solvent or mixture of solvents is essentially insoluble in water. Suitable solvents and cosolvents include the aromatic hydrocarbons and chlorinated hydrocarbons, including halogenated aromatic hydrocarbons, in which the urethane reaction product has good solubility and the mercuric salt or mercury-selenium compound or complex formed has essentially no solubility. Particularly suitable solvents which may be used in the process of the invention are, for example, benzene, toluene, xylenes, trimethylbenzene, dichlorobenzene, dibromobenzene, chloroform and methylene chloride.

The process of the invention is generally carried out at ambient temperature although slightly lower temperatures, or higher temperatures of up to about 100° C. may be employed. Generally, the temperature will be dependent on the selenium compounds to be reacted and removed as well as the thermal stability of the product urethane.

Contact time of the aqueous mercuric salt solution with the selenium-containing crude urethane solution, to permit the precipitate mercury-selenium compound or complex to form, may vary within a range of from one minute to several hours depending on the selenium compound or compounds in the crude urethane to be reacted and removed and the temperature employed. Generally, the contact time will range between about 5 minutes and 1 hour.

Once the mercury-selenium compound or complex precipitate has been removed from the urethane solution, for example, by filtration it may be treated in a number of ways to recover the selenium in catalytically useful form as well as the mercury for reuse in the selenium recovery system. One method may be to dissolve the compound or complex in hot (50°-100° C.) nitric acid forming selenium dioxide which may then be extracted into a hydrocarbon solvent such as benzene leaving a mercuric nitrate solution from which the nitrate may be easily recovered for reuse. Another method is to heat the compound or complex to between 250° to 750° C. in an inert gas stream and collect the volatilized selenium and mercury per se. Another suitable method for recovery of the selenium and mercury from the compound or complex is to convert the selenium and mercury in the presence of air or oxygen, to selenium dioxide and mercuric oxide respectively at temperatures of from about 300° to 600° C., recovering the $SeO_2$ from the effluent reactor stream by cooling to below the sublimination point of $SeO_2$ (approx. 300° C.) to collect the $SeO_2$ and recovering the remaining HgO.

Selenium per se, which may also be present in the crude urethane reaction product, may be readily recovered, preferably by bubbling air through the crude urethane solution to precipitate and essentially remove by filtration the contained selenium. The selenium per se may also be precipitated from the treated solution.

Although the process of the present invention will be directed to the treatment and recovery of selenium compounds from a crude urethane which is a diethyltoluene-2,4-dicarbamate solution containing selenium compounds and produced by the process of U.S. Pat. No. 3,895,054, it is not intended that the process be limited to such carbamate solution and those skilled in the art will recognize that the present process is broadly applicable to the treatment of other urethanes such as methyl N-phenyl carbamate, diethyltoluene-2,6-dicarbamate, dibutyl toluene-2,4-dicarbamate, etc. which have been prepared, for example, by the selenium catalyzed process as described in U.S. Pat. No. 3,895,054.

The following Examples are provided to illustrate the recovery of selenium compounds from a urethane solution in accordance with the principles of this invention but are not to be construed as limiting the invention in anyway except as indicated by the claims.

In the Examples which follow the urethane solutions were obtained by taking the effluent from a metallic selenium catalyst conversion of 2,4-dinitrotoluene to the corresponding diurethane as described in U.S. Pat. No. 3,895,054. The crude urethane solutions contained approximately 17 percent ethanol, 50 percent diethyltoluene-2,4-dicarbamate and related by products, 30 percent triethylamine/pyridine mixture and approximately from about 1 to 3 percent selenium as unreacted metallic selenium, unidentified inorganic selenium and organo-selenium compounds. After separation of the mercury-selenium compound or complex, the compound or complex or the remaining deselenized urethane solution was analyzed by X-ray to determine selenium removal, or the deselenized urethane solution subjected to high speed liquid chromatographic analysis to determine urethane content.

EXAMPLES I TO XII

In Examples I to XII, 10 ml of a selenium-containing diethyltoluene-2,4-dicarbamate solution was contacted with 10 ml of an aqueous mercuric salt solution at a temperature (ambient) of 25° C. and agitated by shaking for 5 minutes. The resulting precipitate which formed was separated by filtration and the urethane solution (filtrate) analyzed by X-ray for selenium removal and by high speed liquid chromatography for urethane content. 100 percent of the urethane was recovered in each case. The results were as follows:

| Ex. No. | Se in urethane ppm | Hg/Se (mole/mole) | Mercuric Salt Soln. | Se in Filtrate ppm | % Se Removed |
|---|---|---|---|---|---|
| 1 | 240 | 36.0 | 1% $Hg(NO_3)_2$ | 10 | 96.1 |
| 2 | 620 | 3.9 | 1% $Hg(NO_3)_2$ | 60 | 89.4 |
| 3 | 270 | 8.6 | 1% $Hg(NO_3)_2$ | 39 | 85.0 |
| 4 | 600 | 0.8 | 1% $Hg(NO_3)_2$ | 280 | 53.8 |
| 5 | 600 | 3.9 | 1% $Hg(NO_3)_2$ | 120 | 80.3 |
| 6 | 230 | 10.0 | 1% $Hg(NO_3)_2$ | 21 | 91.0 |
| 7 | 880 | 2.8 | 1% $Hg(NO_3)_2$ | 40 | 95.0 |
| 8 | 940 | 2.4 | 1% $Hg(NO_3)_2$ | 115 | 88.9 |
| 9 | 194 | 12.0 | 1% $Hg(NO_3)_2$ | <10 | 95.8 |
| 10(1) | 500 | 4.0 | 1% $Hg(NO_3)_2$ | 0 | 100.0 |
| 11 | 510 | 1.25 | 1% $Hg(C_2H_3O_2)_2$ | 0 | 100.0 |
| 12(2) | 545 | 1.0 | 1% $Hg(C_2H_3O_2)_2$ | 0 | 100.0 |

(1)10 ml of benzene added to selenium-containing urethane solution
(2)10 ml of methylene dichloride added to selenium-containing urethane solution

EXAMPLES XIII to XX

In Examples XIII to XX, a selenium-containing diethyltoluene-2,4-dicarbamate solution was contacted with an aqueous mercuric acetate solution with shaking at varying temperatures and reaction times. The resulting precipitate separated by filtration was analyzed by X-ray for selenium removal. Essentially 100 percent of the urethane was recovered. The results are shown in Table I.

TABLE I

| Example No. | Wt. mercuric acetate Soln. g. (%) | Wt. Hg g. | Wt. Hg Soln. g. | Wt. Se g. | Hg/Se (mole/mole) | Temp. °C. | Rx Time Mins. | % Se Removed |
|---|---|---|---|---|---|---|---|---|
| 13 | 100 (5%) | 5.0 | 2.5 | 0.087 | 22.7 | 80 | 15 | 66.4 |
| 14 | 200 (5%) | 10.0 | 2.5 | 0.087 | 45.4 | 50 | 5 | 76.6 |
| 15 | 200 (5%) | 10.0 | 2.5 | 0.087 | 45.4 | 80 | 60 | 74.7 |
| 16 | 200 (5%) | 10.0 | 2.5 | 0.087 | 45.4 | 100 | 15 | 77.4 |
| 17 | 100 (1%) | 1.0 | 50.0 | 0.174 | 2.26 | 80 | 60 | 40.4 |
| 18 | 100 (1%) | 1.0 | 25.0 | 0.087 | 4.54 | 80 | 15 | 53.8 |
| 19 | 50 (1%) | 0.50 | 50.0 | 0.102 | — | 50 | 5 | 99.3 |
| 20 | 50 (1%) | 0.50 | 50.0 | 0.105 | — | 80 | 15 | 99.9 |

EXAMPLES XXI to XXV

In Examples XXI to XXV, a selenium-containing diethyltoluene-2,4-dicarbamate solution was contacted with a 1 percent aqueous solution of mercuric nitrate with shaking for a period of 15 minutes. The resulting precipitate separated by filtration was analyzed by X-ray for seleniuum removal and the precipitate further treated by heating to a temperature of 450° C. in the presence of air to convert the selenium contained in the precipitate to selenium dioxide which was recovered by cooling the effluent air/$SeO_2$ stream to approximately 250° C. Essentially 100 percent of the urethane product was recovered. The results are shown in Table II.

TABLE II

| Example No. | Wt. Hg(NO$_3$)$_2$ Soln. g. | Wt. Hg g. | Wt. Se Soln. g. | Wt. Se g. | Hg/Se (mole/mole) | Temp. °C. | Rx Time Mins. | % Se Removed |
|---|---|---|---|---|---|---|---|---|
| 21 | 50  | 0.5 | 25 | 0.087 | 2.27 | 80 | 15 | 73.5 |
| 22 | 100 | 1.0 | 25 | 0.087 | 4.54 | 80 | 15 | 85.6 |
| 23 | 100 | 1.0 | 25 | 0.087 | 4.54 | 50 | 5  | 87.9 |
| 24 | 150 | 1.5 | 25 | 0.087 | 6.80 | 25 | 15 | 90.8 |
| 25 | 50  | 0.5 | 50 | 0.16  | 5.65 | 80 | 15 | 96.5 |

EXAMPLES XXVI to XXVIII

In Examples XXVI to XXVIII, a selenium-containing diethyltoluene-2,4-dicarbamate solution was contacted with a 1 percent aqueous solution of mercuric chloride with shaking for a period of 15 minutes. The resulting precipitate was removed by filtration and the urethane filtrate solution analyzed by X-ray for selenium removal. The results are shown in Table III.

TABLE III

| Example No. | Wt. HgCl$_2$ Soln. g. | Wt. Hg g. | Wt. Se Soln. g. | Wt. Se g. | Hg/Se (mole/mole) | Temp. °C. | Rx Time Mins. | % Se Removed |
|---|---|---|---|---|---|---|---|---|
| 26 | 150 | 1.5 | 25 | 0.087 | 6.80 | 80 | 15 | 65.3 |
| 27 | 100 | 1.0 | 25 | 0.087 | 4.54 | 50 | 15 | 66.5 |
| 28 | 50  | 0.5 | 25 | 0.087 | 2.27 | 80 | 15 | 56.0 |

We claim:

1. A process for the recovery of selenium from selenium-containing urethane solutions derived from the selenium catalyzed reaction of an organic compound containing at least one hydroxyl group with carbon monoxide and a nitrogenous organic compound at elevated temperatures and pressures in the presence of a base and/or water, which comprises the steps of:
   contacting the selenium-containing urethane solution at a suitable temperature with an aqueous solution of a mercuric salt compound selected from the group consisting of mercuric acetate, mercuric bromide, mercuric chloride, mercuric cyanide and mercuric nitrate or mixtures thereof which salt has a solubility in water of at least 0.5 parts by weight of the salt per 100 parts by weight of water at ambient temperature to form an insoluble mercury-selenium compound or complex precipitate in solution;
   separating the insoluble precipitated compound or complex from the solution;
   subjecting said insoluble mercury-selenium compound or complex to a treatment with nitric acid, heat, air or oxygen to separate selenium and mercury; and
   recovering said selenium.

2. A process according to claim 1 wherein the salt compound is mercuric nitrate.

3. A process according to claim 1 wherein the ratio of mercury to contained selenium in the urethane solution is at least 1:2.

4. A process according to claim 3 wherein the ratio is 4:1.

5. A process according to claim 1 wherein the selenium-containing urethane solution is contacted with an equal volume of an aqueous mercuric salt solution.

6. A process according to claim 1 wherein ambient temperature is employed in the process.

7. A process according to claim 1 wherein the temperature is in the range of from about 25° to 100° C.

8. A process according to claim 1 wherein the concentration of the mercuric salt in aqueous solution is in the range of from about 1 weight percent to 5 weight percent.

9. A process according to claim 1 wherein an essentially water insoluble solvent is added to the selenium-containing urethane solution prior to contact with the aqueous mercuric salt solution.

10. A process according to claim 9 wherein the solvent is an aromatic hydrocarbon or chlorinated hydrocarbon.

11. A process according to claim 10 wherein the solvent is selected from the group consisting of benzene, toluene, xylene, trimethylbenzene, dichlorobenzene, dibromobenzene, chloroform and methylene chloride.

12. A process according to claim 1 wherein the mercury-selenium compound or complex is dissolved in hot nitric acid to form selenium dioxide and said selenium dioxide extracted into a hydrocarbon solvent leaving a mercuric nitrate solution.

13. A process according to claim 12 wherein the solvent is benzene.

14. A process according to claim 1 wherein air is bubbled through the selenium-containing urethane solution to precipitate metallic selenium.

15. A process according to claim 1 wherein the mercury-selenium compound or complex is treated with air or oxygen at a temperature of from about 300° to 600° C. to convert the contained selenium to selenium dioxide and recovering said selenium dioxide.

16. A process according to claim 1 wherein the mercury-selenium compound or complex is heated to between about 250° to 750° C. in an inert gas stream to volatilize the selenium and mercury and separately recovering said volatilized seleniuum and mercury.

17. A process for the recovery of selenium from a selenium-containing diethyl toluene-2,4-dicarbamate solution derived from the selenium catalyzed reaction of ethyl alcohol with carbon monoxide and 2,4-dinitrotoluene at elevated temperature and pressure in the presence of a base and/or water which comprises the steps of:
   contacting the selenium-containing diethyltoluene-2,4-dicarbamate solution with an aqueous solution of a mercuric salt compound or mixture thereof which salt has a solubility in water of at least 0.5 parts by weight of the salt per 100 parts by weight of water at ambient temperature to form an insoluble mercury-selenium compound or complex precipitate in solution;
   separating the insoluble precipitated compound or complex from the solution;
   subjecting said insoluble mercury-selenium compound or complex to a treatment with nitric acid, heat, air or oxygen to separate selenium and mercury; and
   recovering said selenium.

* * * * *